US010669420B2

(12) United States Patent
Mohanty et al.

(10) Patent No.: US 10,669,420 B2
(45) Date of Patent: Jun. 2, 2020

(54) BIOCARBON AND NYLON BASED HYBRID CARBONACEOUS BIOCOMPOSITES AND METHODS OF MAKING THOSE AND USING THEREOF

(71) Applicant: University of Guelph, Guelph (CA)

(72) Inventors: Amar Mohanty, Guelph (CA); Manjusri Misra, Guelph (CA); Emmanuel Olusegun Ogunsona, Guelph (CA); Andrew James Anstey, Guelph (CA); Simonet Evelyn Torres Galvez, Puente Alto Santiago (CL); Amandine Marie Floriane Magali-Sophie Codou, La Garde Freinet (FR); Dylan Fernand Jubinville, Guelph (CA)

(73) Assignee: UNIVERSITY OF GUELPH, Guelph (CA)

( * ) Notice: Subject to any disclaimer, the term of this patent is extended or adjusted under 35 U.S.C. 154(b) by 0 days.

(21) Appl. No.: 15/654,366

(22) Filed: Jul. 19, 2017

(65) Prior Publication Data

US 2018/0022921 A1 Jan. 25, 2018

Related U.S. Application Data

(60) Provisional application No. 62/364,083, filed on Jul. 19, 2016.

(51) Int. Cl.
*C08K 3/04* (2006.01)
*C08L 77/02* (2006.01)
*C08L 77/06* (2006.01)

(52) U.S. Cl.
CPC ............... *C08L 77/02* (2013.01); *C08K 3/04* (2013.01); *C08L 77/06* (2013.01); *C08K 2201/005* (2013.01); *C08L 2205/03* (2013.01); *C08L 2205/035* (2013.01); *C08L 2205/08* (2013.01)

(58) Field of Classification Search
CPC ..... C08K 3/04; C08K 2201/005; C08L 77/02; C08L 2205/03; C08L 2205/035; C08L 2205/08; C08L 77/06
See application file for complete search history.

(56) References Cited

U.S. PATENT DOCUMENTS

| 5,091,469 A * | 2/1992 | Miller | C09J 163/00 525/65 |
| 7,582,241 B2 | 9/2009 | Mohanty et al. | |
| 2011/0236816 A1* | 9/2011 | Stanyschofsky | C09C 1/44 430/108.9 |
| 2012/0108126 A1* | 5/2012 | Elia | B32B 5/024 442/59 |

FOREIGN PATENT DOCUMENTS

JP 10-139936 * 5/1998

OTHER PUBLICATIONS

Machine English Translation of JP 10-139936, Tsukahara et al., May 1998.*
Huber et al., "The Effect of Particle Size on the Rheological Properties of Polyamide 6/Biochar Composites", AIP Conference Proceedings 1664, 150004 ()2015), https:// doi.org/10.1063/1. 4918500, published online May 22, 2015, pp. 15004-1-15004-4.*
Agrawal, P., Oliveira, S. I., Araújo, E. M., & Melo, T. J. (2007). Effect of different polypropylenes and compatibilizers on the rheological, mechanical and morphological properties of nylon 6/PP blends. Journal of Materials Science, 42(13), 5007-5012.
Bose, S., & Mahanwar, P. (2004). Effect of flyash on the mechanical, thermal, dielectric, rheological and morphological properties of filled nylon 6. Journal of Minerals & Materials Characterization & Engineering, 3, 65-89.
Bose, S., & Mahanwar, P. (2004). Effect of particle size of filler on properties of nylon-6. Journal of Minerals & Materials Characterization & Engineering, 3, 23-31.
Cantwell, W., & Morton, J. (1991). The impact resistance of composite materials—a review. Composites, 22(5), 347-362.
Das, O., Sarmah, A. K., & Bhattacharyya, D. (2015). A novel approach in organic waste utilization through biocarbon addition in wood/polypropylene composites. Waste Management, 38, 132-140.
Fornes, T., & Paul, D. (2003). Modeling properties of nylon 6/clay nanocomposites using composite theories. Polymer, 44, 4993-5013.
Fu, S.-Y., Feng, X.-Q., Lauke, B., & Mai, Y.-W. (2008). Effects of particle size, particle/matrix interface adhesion and particle loading on mechanical properties of particulate—polymer composites. Composites Part B: Engineering, 39(6), 933-961.
Hamad, K., Kaseem, M., & Deri, F. (2011). Rheological and mechanical characterization of poly (lactic acid)/polypropylene polymer blends. Journal of Polymer Research, 18(6), 1799-1806.
Huber, T., Misra, M., & Mohanty, A. (2015). The Effect of Particle Size on the Rheological Properties of Polyamide 6/Biocarbon Composites. Proceeding of 30th International Conference of the Polymer Processing Society (pp. 15004 (1-4)). Cleveland, Ohio, USA: AIP Conference Proceedings.
Huber, T., Misra, M., & Mohanty, A. K. (2014). Mechanical properties of compatibilized nylon 6/polypropylene blends; studies of the interfacial behavior through an emulsion model. Journal of Applied Polymer Science, 131(18), 40792.
La Mantia, F. P. (1993). Blends of polypropylene and nylon 6: Influence of the compatibilizer, molecular weight, and processing conditions. Advances in Polymer Technology, 12(1), 47-59.
Liang, J.-Z. (2002). Toughening and reinforcing in rigid inorganic particulate filled poly(propylene): A review. Journal of Applied Polymer Science, 83(7), 1547-1555.

(Continued)

*Primary Examiner* — Patrick D Niland
(74) *Attorney, Agent, or Firm* — Eduardo Krupnik (57) ABSTRACT

A polymer blend comprising polyamide, polypropylene (PP) and at least one of poly (lactic acid) (PLA) and a multi-phase compatibilizer comprising PA11-co-PP-maleic anhydride (MA). The polymer blend can be reinforced with hybrid fillers including biocarbon, glass fiber, carbon fiber and nano-clay to create composites useful in the creation of products of manufacture such as auto parts.

19 Claims, 1 Drawing Sheet

(56) References Cited

OTHER PUBLICATIONS

Mohanty, A., Tummala, P., Misra, M., & Drzal, L (2009). U.S. Pat. No. 7,582,241, 2009.
Mohanty, A., Vivekanandhan, S., Anstey, A., & Misra, M. (2015). Sustainable Composites from Renewable Biocarbon and Engineering Plastic. 20th International Conference on Composite Materials. Copenhagen.
Myllytie, P., Misra, M., & Mohanty, A. (2016). Carbonized Lignin as Sustainable Filler in Biobased Poly(trimethylene terephthalate) Polymer for Injection Molding Applications. ACS Sustainable Chemistry & Engineering, 4, 102-110.
Ozen, E., Kiziltas, A., Kiziltas, E. E., & Gardner, D. J. (2013). Natural fiber blend-nylon 6 composites. Polymer composites, 34(4), 544-553.
Pai, F.-C., Lai, S.-M., & Chu, H.-H. (2013). Characterization and Properties of Reactive Poly(lactic acid)/Polyamide 610 Biomass Blends. Journal of Applied Polymer Science, 130(4), 2563-2571.
Ruschau, G., & Newnham, R. (1992). Critical Volume Fractions in Conductive Composites. Journal of Composite Materials, 26, 2727-2735.
Sathe, S. N., Devi, S., Rao, G. S., & Rao, K. (1996). Relationship between morphology and mechanical properties of binary and compatibilized ternary blends of polypropylene and nylon 6. Journal of Applied Polymer Science, 61(1), 97-107.
Shashidhara, G. M., Biswas, D., Pai, B. S., Kadiyala, A. K., Feroze, G. S., & Ganesh, M. (Jul. 2009). Effect of PP-g-MAH compatibilizer content in polypropylene/nylon-6 blends. Polymer Bulletin, 63(1), 147-157.
Tajvidi, M., Feizmand, M., Falk, R., & Felton, C. (2008). Effect of Cellulose Fiber Reinforcement on the Temperature Dependent Mechanical Performance of Nylon 6. Journal of Reinforced Plastics and Composites, 28, 2781-2790.
Tandon, G. & Weng, G. (1984). The effect of aspect ratio of inclusions on the elastic properties of unidirectionally aligned composites. Polymer Composites, 5(4), 327-333.
Vold, J., Ulven, C., & Chisholm, B. (2014). Torrefied biomass filled polyamide biocomposites: mechanical and physical property analysis. Journal of Materials Science, 50, 725-732.
Wang, Y.-L., Hu, X., Li, H., Ji, X., & Li, Z.-M. (Sep. 2010). Polyamide-6/Poly(lactic acid) Blends Compatibilized by the Maleic Anhydride Grafted Polyethylene-Octene Elastomer. Polymer-Plastics Technology and Engineering, 49 (12), 1241-1246.
Xu, X. (2008). Cellulose Fiber Reinforced Nylon 6 or Nylon 66 Composites (Doctoral dissertation). Georgia Institute of Technology.
Yoo, T. W., Yoon, H. G., Choi, S. J., Kim, M. S., Kim, Y. H., & Kim, W. N. (2010). Effects of Compatibilizers on the Mechanical Properties and Interfacial Tension of Polypropylene and Poly(lactic acid) Blends. Macromolecular Research, 18(6).

* cited by examiner

BIOCARBON AND NYLON BASED HYBRID CARBONACEOUS BIOCOMPOSITES AND METHODS OF MAKING THOSE AND USING THEREOF

CROSS REFERENCE TO RELATED APPLICATIONS

This application claims the benefit of U.S. Provisional Ser. No. 62/364,083, filed Jul. 19, 2016, the contents of which are hereby incorporated by reference into the present disclosure.

FIELD OF THE INVENTION

The present invention relates to nylon and biocarbon based carbonaceous hybrid biocomposites and methods of making those, more particularly to high-performance nylon blend composites using hybridized reinforcement with biocarbon and other filler materials, including glass fiber, carbon fiber and mineral fillers.

BACKGROUND OF INVENTION

Nylon Based Matrix Systems
Nylon and Polypropylene Binary Blends

Several studies have investigated the binary blends of nylon with polypropylene (PP), including the use of compatibilizers, namely maleic anhydride grafted PP (MAPP) and acrylic copolymers (Agrawal, Oliveira, Araújo, & Melo, 2007; Huber, Misra, & Mohanty, 2014; Sathe, Devi, Rao, & Rao, 1996; La Mantia, 1993; Shashidhara, et al., 2009). Analysis of uncompatibilized blends have shown that nylon and PP are immiscible, which results in inferior mechanical properties that are below those expected based on the rule of mixtures (La Mantia, 1993; Shashidhara, et al., 2009). The miscibility of nylon and PP can be improved by adding a MAPP compatibilizing agent in amounts from 2-5 parts per hundred to binary nylon-PP blends.

Compatibilization with MAPP is also known to increase the ductility and impact strength of nylon/PP blends to above that of either neat polymer. However, even with the addition of MAPP, the tensile strength and Young's modulus of nylon/PP blends is reduced well below the strength and stiffness of neat nylon, and below the expected rule of mixtures (Shashidhara, et al., 2009). Shashidhara et al. showed that while the addition of MAPP improved the tensile performance of blends, they still underperformed compared to the theoretical properties determined by the rule of mixtures (Shashidhara, et al., 2009).

Based on these studies, nylon/PP binary blends are incompatible without the use of a compatibilizer. It can be expected that compatibilized nylon/PP binary blends can be achieved with improved impact strength, but at the cost of reduced tensile strength and stiffness compared to neat nylon and theoretical values.

Nylon/PLA Binary Blends

Two studies have been identified which investigated the binary blending of PLA and nylon, including the use of epoxy resin and maleic anhydride grafted polyethylene-octene elastomer as compatibilizing agents (Pai, Lai, & Chu, 2013; Wang, Hu, Li, Ji, & Li, 2010). Pai et al. investigated the reactive extrusion of 50/50 PLA/nylon 6,10 blends to improve compatibility between the polymers (Pai, Lai, & Chu, 2013). While the addition of epoxy resin resulted in a slight increase in properties compared to the neat binary blend, the tensile strength, Young's modulus, flexural strength, flexural modulus, elongation and notched impact strength were below the properties of either neat polymer. The only improved property was the un-notched impact strength. Wang et al. similarly found that while the poor miscibility of nylon and PLA could be improved with the addition of maleic anhydride grafted polyethylene-octene elastomer, the tensile strength and Young's modulus of the blend was inferior to either neat polymer (Wang, Hu, Li, Ji, & Li, 2010). In fact, the addition of the compatibilizer decreased the tensile strength and Young's modulus compared to the uncompatibilized binary blend—only the impact strength was increased to the equivalent of neat nylon.

Based on these studies, nylon/PLA binary blends are incompatible without the use of compatibilizer. The miscibility can be improved using compatibilizing agents, but the prepared blends can be expected to have inferior mechanical properties compared to either neat polymer, and below the expected theoretical values. The impact strength can be improved to the point that it is at most equal to that of neat nylon, however this comes at the cost of a drastic decrease in tensile strength and stiffness.

PLA/PP Binary Blends

Two studies have been identified which investigated the binary blends of PLA and PP (Hamad, Kaseem, & Deri, 2011; Yoo, et al., 2010). Hamad et al. investigated PLA/PP blends at 100/0, 70/30, 50/50, 30/70 and 0/100 ratios, and found the two polymers to be immiscible based on the interfacial tension of the blends, and tensile strength that was far inferior to the theoretical value based on the rule of mixing (Hamad, Kaseem, & Deri, 2011). They found that due to the poor miscibility, the binary blends had very poor tensile strength, but the Young's modulus was increased with the addition of the stiffer PLA phase. This study did not investigate any compatibilization of the blend. Yoo et al. studied similar binary PP/PLA (80/20 ratio) blends, but with the addition of MAPP and styrene-ethylene-butylene-styrene-g-maleic anhydride (SEBS-g-MA) compatibilizers (Yoo, et al., 2010). They found that the addition of MAPP improved the tensile strength of the blends slightly, but did not meet the expected value based on the rule of mixtures. However, MAPP addition had no effect on the impact strength of the blend. SEBS-g-MA had an opposite effect to MAPP—its addition to the blend decreased the tensile strength of the blend, but improved the impact strength.

Based on these studies, PP/PLA binary blends are incompatible, but miscibility can be improved with the use of compatibilizers, namely MAPP and SEBS-g-MA. However, even with the use of compatibilizers, there is a trade-off between increasing the tensile strength and the impact strength of the blend. Even with the use of the correct compatibilizing agent, the tensile strength is inferior to the value predicted by the rule of mixtures.

Based on the studies shown above, it should be expected that a ternary blend of nylon, PP and PLA will have poor performance, due to the inherent immiscibility/incompatibility of each polymer with each other. While compatibilizing agents have been shown in other studies to improve several properties of the binary blends, these improvements do not exceed the values predicted by the rule of mixtures, and come at the cost of decreases in other mechanical properties (ie; improved tensile strength comes at the cost of decreased impact strength).

Composites

The application of polymer biocomposite materials is becoming increasingly common in automotive components, including components such as interior panels, dashboards, liners and trims. Automotive biocomposites are generally composed of a polymer matrix, such as polypropylene (PP) or polyethylene (PE), which is blended with a natural fiber such as flax or hemp to provide reinforcement. This is analogous to synthetic materials such as fiberglass composites, in which a polymer is reinforced with glass fiber to significantly improve its strength. The benefit of utilizing natural fibers, rather than synthetic reinforcements, is that they are low cost, low density, and can be sustainably manufactured with a lower carbon footprint. This results in weight savings at a competitive price, which is crucial in an automobile industry that is striving to improve fuel efficiency in any way possible.

Polyamide is a widely known and utilized engineering polymer especially in the automotive industry. From the stand point of having excellent mechanical performance, good thermal properties and wear resistance, it is superior to many of the petroleum based polymers such as PP and PE. Polyamide has numerous commercial applications such as packaging, fiber materials, auto part application, etc. because of its large scale availability in the market at a reasonable price and ease of production. Applications of this polymer in areas that require very high strengths, moduli and sudden impact are however hindered by its relatively lower strengths and moduli in comparison to metals and inherent sensitivity to notch.

Composite materials have been applied in under-the-hood automobile components to achieve weight savings by replacing metal components with lighter polymer-based materials. Due to the high temperatures, stress and pressure experienced by under-the-hood components, these composites must utilize engineering plastics, mainly polyamides such as nylon 6 and nylon 6,6. These polymers are able to withstand high temperatures and pressures, but have high melting points, and thus require processing at high temperatures (up to 270° C.) to produce molded components. This requirement makes natural fiber reinforcements inherently inappropriate, as such biofibers burn at that high temperature. Approaches have been developed to improve the strengths and moduli of polyamide by the use of light weight reinforcing fillers such as natural fibers and fillers. However, major issues such as degradation and emission of odor from these fillers during composite fabrication have been noticed; resulting in reduction of the fiber integrity. Ozen and co-workers studied the fabrication of nylon hybrid biocomposites with a combination of different natural fibers through melt mixing at varying fiber loading between 5-20 wt % (Ozen, Kiziltas, Kiziltas, & Gardner, 2013). It was found that addition of natural fibers improved the mechanical properties significantly. However, it was observed from the morphology of the composites that the interface between the nylon and fibers was poor. The issues of thermal stability of the fibers always remain as long as there is no pretreatment done to them.

U.S. Pat. No. 7,582,241 to Mohanty, Tummala, Misra, and Drzal, describes a way to solve the issues stated above by reducing the melting temperature of nylon with the use of inorganic salts (U.S. Pat. No. 7,582,241, 2009). The resulting composites exhibited enhancement in the mechanical properties as a result. The ability to successfully incorporate natural fibers into nylon was achieved. A drawback to this process was that it required a two stage process. The first stage was the incorporation of the salt in the nylon to reduce the melting temperature, followed by the second stage of adding the fibers there after. This creates added cost to the manufacturing process and eventually to the finished composite material. To combat the low thermal stability of natural fibers, Vold et al. investigated the thermal pretreatment of sunflower hull by torrefaction and use thereof as reinforcement in nylon (Vold, Ulven, & Chisholm, 2014). They also incorporated untorrefied sunflower hull in nylon and compared the mechanical properties. It was observed that a strong odor was given off during composite fabrication with the untorrefied natural fibers, whereas the odor was not observed with the torrefied fibers as reported. It was also noticed that the torrefied natural fiber composites exhibited better tensile strength in comparison to that of the untorrefied fiber composite. However, the authors also observed some voids at the interface between the torrefied fibers and nylon matrix. It was suggested that the torrefaction process was incomplete and therefore resulted in some level of fiber decomposition.

Cellulose fibers have high thermal stability and are capable of being used as reinforcement in nylons or engineering polymers. Their nano-sized structure improves surface area contact with the matrix and allows for better load transfer. However, the difficulty in dispersing the cellulose fibers within the matrix results in agglomerates of cellulose fibers and thereby hindering the optimized properties of the composite. A study on cellulose fiber reinforced nylon composites revealed that the introduction of cellulose into nylon enhanced the tensile and flexural properties up to 30 wt % (Xu, 2008). However, the difficulty of dispersing the cellulose fibers evenly within the matrix was a problem. Longer processing time and higher shear rates will be required in improving dispersion but is hindered by the possible degradation of the cellulose fibers for long periods of processing. Tajvidi et al. studied the effect of different temperatures on the mechanical properties of cellulose reinforced nylon (Tajvidi, Feizmand, Falk, & Felton, 2008). It was found that there was a drastic decrease in properties at higher temperatures, especially that of the modulus. However, it was observed that the composite possessed better temperature resistance than pure nylon. Light weight and thermally stable carbonized lignin was used to reinforce polytrimethylene terephthalate by Myllytie et al. (Myllytie, Misra, & Mohanty, 2016). At optimized conditions, the flexural strength and modulus was observed to increase while also having improvements in the heat deflection temperature and dimensional stability. In comparison to commercially available mineral filled composite systems, the lignin-reinforced PET was found to be superior. Huber et al. studied the rheological effects of biocarbon reinforced nylon 6 (Huber, Misra, & Mohanty, 2015). They found that the reduction in particle size drastically reduced the viscosity of the composite melt and suggested that this could have an effect on the mechanical performance. This suggestion indicates that by reducing the particle size, increased surface area is achieved and better wetting of the filler by the matrix as well. In another study, biocarbon from miscanthus fibers was incorporated into nylon 6 without pretreatment such as milling or grinding (Mohanty, Vivekanandhan, Anstey, & Misra, 2015). The mechanical performance of the nylon was observed to decrease with the incorporation of biocarbon. This was due to the intrinsic defective structure which did not undergo any form of pretreatment.

From the above it can be concluded that the use of natural fiber even after torrefaction still poses significant hurdles to be utilized in high temperature composite fabrications such as nylon composites. As such, commercial under-the-hood composites are generally reinforced with glass fibers and/or mineral fillers, such as talc or clay. While these fillers are thermally stable and provide excellent improvements in mechanical properties, they are non-renewable materials with relatively high densities, which limits weight savings.

SUMMARY OF INVENTION

The present invention overcomes the disadvantages of the prior art by utilizing tailored biocarbon as a filler material in hybrid biocomposites with nylon blended systems. Biocarbon is a carbonaceous material produced by the pyrolysis of biomass in a low-oxygen environment. Biocarbon is a low-cost renewable material that can be produced sustainably with a low carbon footprint—in fact, biocarbon can be produced with net negative carbon emissions. Biocarbon is thermally stable at high temperatures, and can be blended with engineering plastics without degrading to produce strong, stiff composites. Biocarbon reinforcement filled blend was hybridized with glass fiber and carbon fiber to achieve very high strength and stiffness without compromising the density of the composite relative to other commercially available composites utilizing talc or glass fiber as reinforcement.

In the present invention, the biocarbon filler can be processed with engineered polymers without the problem of thermal degradation. Processing parameters can be engineered to optimize the mechanical properties Also, at higher loading of 40 wt % similar, and in some cases, superior, mechanical properties are achieved in comparison to cellulose filled nylon systems. Furthermore, biocarbon filled systems can be realized with excellent processability and thermal stability suitable for automotive injection moulding applications.

As such, in one embodiment, the present application provides for a polymer blend comprising polyamide (PA), polypropylene (PP) and at least one of poly (lactic acid) (PLA) and a multi-phase compatibilizer comprising PA11-co-PP-maleic anhydride (MA).

In one embodiment of the polymer blend of the present invention, the PA is PA 6, PA 6,6 or PA 6,10.

In another embodiment of the polymer blend of the present invention, the polymer blend includes from about 60 to about 85% by weight of the PA, up to about 20 wt. % of the PLA and up to about 20 wt. % of the PP.

In another embodiment of the polymer blend of the present invention, the polymer blend comprises PA, PP, PLA and an additive selected from a compatibilizing agent, a chain extender, or both a compatibilizing agent and a chain extender.

In another embodiment of the polymer blend of the present invention, the polymer blend comprises PA, PP, PLA and about 7.5% wt. or less of a compatibilizing agent.

In another embodiment of the polymer blend of the present invention, the polymer blend comprises PA, PP and the multi-phase compatibilizer comprising PA11-co-PP-maleic anhydride (MA).

In another embodiment of the polymer blend of the present invention, the polymer blend further comprises no more than 10% wt. of the PLA.

In another embodiment of the polymer blend of the present invention, the compatibilizing agent is a maleated polyolefin or epoxidized natural rubber.

In another embodiment of the polymer blend of the present invention, the maleated polyolefin is maleated polypropylene (MAPP), maleated polyethylene (MAPE), or a mixture of MAPP and MAPE.

In another embodiment of the polymer blend of the present invention, the polymer blend further includes about 7.5% wt. or less of a chain extender.

In another embodiment of the polymer blend of the present invention, the blend has a greater flexural strength, flexural modulus and impact strength than pure nylon.

In one embodiment, the present invention relates to a composite comprising a polymeric blend of polyamide (PA) and polypropylene (PP) and biocarbon.

In one embodiment, the composite further comprises epoxidized natural rubber (ENR).

In another embodiment, the composite further comprises a filler selected from carbon fiber, glass fiber, mineral fiber such as, talc and nanoclay, or any combinations thereof.

In another embodiment, the composite further comprises a melt flow enhancer. In one aspect, the melt flow enhancer is poly (lactic acid) (PLA), and the PLA is 10% wt. or less of the composite.

In another embodiment, the polymeric blend comprises PA 6, PLA, PP and MAPP, and the composite further comprises carbon fiber, epoxidized natural rubber and zinc stearate.

In another embodiment, the polymeric blend comprises PA 6, PLA, PP, MAPP and MAPE, and wherein the composite further comprises glass fiber and zinc stearate.

In another embodiment, the biocarbon has a particle size of about 63 μm or less.

In another embodiment, the composite has similar or enhanced impact strength relative to pure PA.

In another embodiment, the composite further includes a copper salt thermal stabilizer.

The present invention relates also to a polyamide (PA)-based composite having similar or enhanced impact strength relative to pure PA, the composite comprising PA and biocarbon, wherein the biocarbon has a particle size of about 63 μm or less.

In one embodiment of the PA-based composite of the present invention, the PA is PA 6,10 or PA6.

In another embodiment of the PA-based composite of the present invention, the PA is PA 6.

In another embodiment of the PA-based composite of the present invention, the composite comprises about 80 wt. % nylon and about 20 wt. % biocarbon.

In another embodiment of the PA-based composite of the present invention, the biocarbon has a mean particle size between about 2 μm and about 3.8 μm.

In another embodiment of the PA-based composite of the present invention, the composite comprises about 90 wt. % PA 6 and about 10 wt. % biocarbon.

In one embodiment, the present invention provides for an article of manufacture that is made from any of the composites described in the above embodiments.

In another embodiment, the present invention provides for a method of enhancing thermal stability of a binary or ternary hybrid system. In one embodiment, the method includes adding a copper salt thermal stabilizer to the binary or ternary hybrid system, wherein the binary system includes a polyamide and polypropylene, and the ternary hybrid system includes a polyamide, polypropylene and poly (lactic acid).

In another embodiment, the present invention provides for a multi-phase compatibilizer for a binary system of PA and PP, the multi-phase compatibilizer including PA11-co-PP-maleic anhydride.

BRIEF DESCRIPTION OF THE DRAWINGS

Embodiments will be described, by the way example only, with the reference to the drawings, in which.

DETAILED DESCRIPTION OF INVENTION

I. Definitions

Unless defined otherwise, all technical and scientific terms used herein have the same meaning as commonly understood by one of ordinary skill in the art to which this invention belongs. Also, unless indicated otherwise, except within the claims, the use of "or" includes "and" and vice versa. Non-limiting terms are not to be construed as limiting unless expressly stated or the context clearly indicates otherwise (for example "including", "having" and "comprising" typically indicate "including without limitation"). Singular forms included in the claims such as "a", "an" and "the" include the plural reference unless expressly stated otherwise. In order to aid in the understanding and preparation of the within invention, the following illustrative, non-limiting, examples are provided.

The term "about" modifying any amount refers to the variation in that amount encountered in real world conditions of producing materials such as polymers or composite materials, e.g., in the lab, pilot plant, or production facility. For example, an amount of an ingredient employed in a mixture when modified by about includes the variation and degree of care typically employed in measuring in a plant or lab producing a material or polymer. For example, the amount of a component of a product when modified by about includes the variation between batches in a plant or lab and the variation inherent in the analytical method. Whether or not modified by about, the amounts include equivalents to those amounts. Any quantity stated herein and modified by "about" can also be employed in the present invention as the amount not modified by about.

The prefix "bio-" is used in this document to designate a material that has been derived from a biological resource.

"Biocarbon", as used herein, refers to the material obtained from the pyrolysis of biomass, such as plant fibers, agricultural/forest biomass, municipal solid waste (MSW), and/or animal/bird manures, etc. The pyrolysis is typically performed above about 475° C.

"Torrefied", refers to material derived from mild pyrolysis (200-300° C.) of biomass.

The term "wt. %" refers to the weight percent of a component in the composite formulation with respect to the weight of the whole composite formulation.

"Blend", as used herein, means a macro-homogeneous mixture of two or more different polymers. The resultant blend may or may not contain distinct phases of its components.

The terms "heat deflection temperature" or "heat distortion temperature" (HDT) are used interchangeably and refer to the temperature at which a polymer or plastic sample deforms under a specified standard load. The heat distortion temperature is determined by the following test procedure outlined in ASTM D648. The test specimen is loaded in three-point bending in the edgewise direction. The two most common loads are 0.455 MPa or 1.82 MPa and the temperature is increased at 2° C./min until the specimen deflects by 0.25 mm over 50 mm span.

"Impact strength", as used herein, refers to the capability of a material to withstand a suddenly applied load or impact and is expressed in terms of energy. Impact strength is typically measured with the Izod impact strength test or Charpy impact test, both of which measure the impact energy required to fracture a sample. Izod impact testing is an ASTM standard method of determining the impact resistance of materials. An arm held at a specific height (constant potential energy) is released. The arm hits the sample and breaks it. From the energy absorbed by the sample, its impact energy is determined. A notched sample is generally used to determine impact energy and notch sensitivity.

II. Matrix System

A blend matrix system comprising nylon, poly (lactic) acid (PLA) and polypropylene (PP) is provided. The ternary blend of nylon, PLA and PP of the present invention improves several key properties relative to the properties of neat or virgin nylon, including impact strength, increased hydrophobicity and reduced density, while keeping other properties equal to or within 5% of those of neat nylon.

As described in the background section above, binary blends of nylon/PP (Agrawal, Oliveira, Araújo, & Melo, 2007; Huber, Misra, & Mohanty, 2014; Sathe, Devi, Rao, & Rao, 1996; La Mantia, 1993; Shashidhara, et al., 2009) and binary blends of nylon/PLA (Pai, Lai, & Chu, 2013; Wang, Hu, Li, Ji, & Li, 2010) and PLA/PP (Hamad, Kaseem, & Deri, 2011; Yoo, et al., 2010) have been extensively researched. However, based on the data obtained in these studies, there is no reason for one skilled in the art to assume that by mixing nylon, PP and PLA in a ternary blend, a good alloy can be achieved. While certain good properties may be achieved in the binary blends, there are drawbacks associated with each binary blend. In addition, there is inherent difficulty in the design of ternary blends, especially involving three immiscible polymers.

Based on the studies shown above, it should be expected to one skilled in the art that a ternary blend of nylon, PP and PLA will have poor performance, due to the inherent immiscibility/incompatibility of each polymer with the other two. While compatibilizing agents have been shown in other studies to improve several properties of the binary blends, these improvements do not exceed the values predicted by the rule of mixtures, and come at the cost of decreases in other mechanical properties (i.e. improved tensile strength comes at the cost of decreased impact strength).

However, these drawbacks have been herein overcome by achieving a synergistic blend of nylon/PP/PLA with balanced properties that match or exceed the properties of pure nylon, which is unexpected, even considering the use of compatibilizing agents to increase the compatibility of the blends. As evidenced in Table 5 the ternary blend of the present invention, nylon, PLA and PP, have been effectively compatibilized to produce a blend that not only exceeds the theoretical properties expected by the rule of mixture, but exceeds or is within 5% the properties of pure nylon 6 polymer.

Technical advantages of the ternary blend of the present invention include a blend that is less hydrophilic than neat nylon without affecting the flexural modulus and with an increased biobased content.

A. Nylon

Any polyamides (PA) may be used in the blends and composites of the present invention such as synthetic PA 6, PA 6,6 and PA 6,10 or a biobased PA. The ternary blend of the present invention may include (% by weight) from about 60% to about 90% of nylon, including 61, 62, 63, 64, 65, 66, 67, 68, 69, 70, 71, 72, 73, 74, 75, 76, 77, 78, 79, 80, 81, 82, 83, 84, 85, 86, 87, 88, 89 and 90%. More than 90 wt. % and less than 60 wt. % may also be used. The content of 90% by weight may be preferred. Fraction units are also included, for example, X.1, X.2, X.3, X.4, X.6, X.7, X.8 and X.9%, wherein "X" is an integer equal or greater than 60.

Nylon may be sourced from post-consumer recycled nylon to reduce environmental impact through repurposing waste materials. Nylon used in this invention may also include those commercially available from BASF as Ultramid B3K and Ultramid B27E.

B. Poly(Lactic Acid) (PLA)

The PLA may be commercially available or synthesized resin made from lactic acid. The copolymers of poly (lactic acid) also may be used for blending. PLA may also be random copolymer of L-lactic and D-lactic acid. The stereo complex of poly (L-lactide) and poly (D-lactide) may also be used in this invention. The number-average molecular weight of poly (lactic acid) may be in the range of 50000-450000 while polydispersity index may be in the range of 1-3. The poly (lactic acid) having the molecular weight in the range of 100000-250000 is preferred from melt viscosity considerations. The PLA may be that available from Natureworks LLC as Ingeo biopolymer 3251D.

In one embodiment of the present invention a post-consumer or post-industrial waste PLA also may be used instead of virgin PLA. PLA in blends may constitute from about 0 to about 15% by weight. Preferably, the PLA used is injection molding grade with high melt flow index to improve the processability of the composite. The content of about 5% PLA by weight may be preferred as ensuring the best combination of mechanical properties and heat resistance. As such, the amount of PLA in the blends of the present invention may include (% by weight) 1%, 2%, 3%, 4%, 5%, 6%, 7%, 8%, 9%, 10%, 11%, 12%, 13%, 14%, 15%, and any fraction unit in between, for example, X.1, X.2, X.3, X.4, X.6, X.7, X.8 and X.9%, wherein "X" is an integer equal or greater than 0.

C. Polypropylene

PP in blends of the present invention may constitute from about 0 to about 15% by weight. Preferably, the PP used is injection molding grade with high melt flow index to improve the processability of the composite. The content of about 5% PP by weight may be preferred as ensuring the best combination of mechanical properties and heat resistance. As such, the amount of PP in the blends of the present invention may include (% by weight) 1%, 2%, 3%, 4%, 5%, 6%, 7%, 8%, 9%, 10%, 11%, 12%, 13%, 14%, 15%, and any fraction unit in between, for example, X.1, X.2, X.3, X.4, X.6, X.7, X.8 and X.9%, wherein "X" is an integer equal or greater than 0.

The PP used in this invention, may be the one marketed by Pinnacle Polymers as PP 1120H.

D. Additives

Additive agents may be used in the ternary blends of the present invention in amounts ranging from about 0 to about 8 wt. % of the ternary blend.

Agents that may be used include compatibilizers, modifiers and chain extenders. Chain extenders may include ethylene-maleic anhydride alternating copolymers. Compatibilizer include maleated co-polymer such as maleated polyolefin (MAPP and MAPE) or multi-phase compatibilizers containing both polyamide and polyolefin. Modifiers may include epoxidized natural rubber and natural rubber.

III. Composites

In another embodiment, the present invention provides for biocarbon filled nylon hybrid biocomposites. In one embodiment, the biocomposite comprises nylon and biocarbon. The biocomposite of the present invention may also include fillers such as E-glass fibers, talc, carbon fiber and nanoclay, as well as compatibilizers such as maleated polyolefin (MAPP and MAPE) and other maleated copolymers, epoxidized natural rubber, natural rubber. The biocarbon may be provided as pyrolyzed biomass e.g. miscanthus, switch grass, and coffee chaff and so forth. The nylon may be any polyamide or combination of polyamides of various grades (nylon 6, nylon 6,6, nylon 6,10 just to mention a few).

The ternary nylon-based matrix blends described herein can be used to prepare the composites of the present invention. The composites may be prepared by combining the matrix blends described herein above with one or more additives selected from fillers, such as natural fibers, and/or mineral fillers to form the composites.

The composites of the present invention may be prepared by melt compounding e.g. twin-screw extrusion and injection molding techniques may be used in fabricating biocomposite samples for testing. The required ASTM standards were adopted in measuring the performance of the fabricated biocomposite materials.

Light-weight nylon and biocarbon based hybrid biocomposites of the present invention may be used to replace/substitute certain injection molded nylon composites used in industry, such as for auto-parts uses. The typical filler as used today for nylon-filled injection molded parts are talc and E-glass fiber each filler having density in the range of 2.5 to 2.6 gm/cm$^3$. The injection molded traditional talc/glass-filled nylon based composite as being used in auto-parts possess density at around 1.3 to 1.45 g/cm$^3$. The nylon and biocarbon based hybrid biocomposites of the present invention have a density in the range from 1.12 to 1.25 g/cm$^3$ (see Tables 6-8) and certain biocomposites formulations showed a weight reduction from 15 to 20 wt. % as compared to traditional nylon-filled composite parts without compromising on the physical properties of traditional nylon-filled composites, such as the mechanical strength and required durability for targeted applications, and heat deflection temperature (HDT). In one embodiment, the nylon and biocarbon based hybrid composite may comprise about 60-80 wt. % nylon and about 20-40 wt. % biocarbon. Preferably, the biocarbon content is about 15-30 wt. %.

The biocarbon used in this invention may be produced from the pyrolysis of one or more types of biomass, including purpose-grown biomass, such as miscanthus and switchgrass; paper and pulp production residue, such as lignin; agricultural residues, such as corn stover, coffee chaff, distillers' dried grains and solubles (DDGS); and waste stream products such as spent coffee grinds, municipal solid waste (MSW) and livestock manures. The physical and chemical properties of the biocarbon may vary depending on the biomass feedstock that is utilized. The pyrolysis can be completed in an oxygen-poor environment between 475 and 900° C., preferably between 475 to 690° C., a temperature range at which the solid biocarbon phase is the favored product.

The biocarbon may be further processed by means of grinding, milling and sieving to manipulate the particle size of the material to be used in the composites in order to achieve desired properties. Particle size reduction may be achieved using milling equipment including a ball mill, or a 2-roll mill. The processed biocarbon may be combined with the polymers and additives during extrusion, and can be fed into the extruder using a screw feeder.

In the present invention the filler may be any filler used to obtain polymer composites with enhanced mechanical properties and heat resistance. Fillers used in this invention may be crystalline cellulose, carbon fiber, silica, glass fiber, talc, nano-clay, calcium sulphate, mica, zinc stearate, calcium carbonate sourced both from natural sources and chemically synthesized for this purpose. The composite also may contain other mineral fillers not listed in present invention and combination of the various mineral fillers.

The mineral filler may be in the form of particles or fibers. An example of fiber may include glass fiber having various length to diameter ratios or carbon fiber.

The content of the fillers/fibers in the composite may be from about 0 wt. % to about 40 wt. % and any range in between, such as from about 0 wt. % to about 30 wt. % of the composite, or from about 0 wt. % to about 20 wt. % of the composite, or from about 0 wt. % to about 5 wt. % of the composite, or from about 0 wt. % to about 4 wt. %, or from about 0 wt. % to about 3 wt. %.

Biocarbon may be provided from about 20-40 wt. %, glass fiber may be provided between about 0-10 wt. %, carbon fiber may be provided between about 0-4 wt. %, crystalline cellulose may be provided between about 0-20 wt. %, zinc stearate may be provided between about 0-0.4 phr, talc may be provided from about 0-5 wt. % and nanoclay may be provided from about 0-3 wt. %.

The use of natural filler also reduces the cost of the final formulation.

The composites of the present invention may also include one or more compatibilizers and chain extenders.

Epoxidized natural rubber (ENR) may be used as an impact modifier. ENR may be that manufactured by Sanyo Corporation of America. The amount of each chain extender, compatibilizer and impact modifier used may vary depending on nylon and other ingredients content and type of chain extender used. In the case of ENR, the amount of ENR may be in the range of about 0-5 phr.

The blends and composites of the present invention may also include a thermal stabilizer. As it can be seen in the results below, with the addition of a copper salt based heat stabilizer, the long term mechanical performance of binary (PA6/PP) and ternary (PA6/PP/PLA) hybrid biocomposites exposed to high temperatures can be significantly enhanced, resulting in a composite that is suited for applications requiring high thermal stability.

The thermal stabilizer may be a copper salt heat stabilizer having a copper compound and an alkali metal halide. The copper may be Cu(I), Cu(II), or a mixture thereof. Cu(I) salts are preferred. Examples of copper heat stabilizers useful in the composites of the present invention include copper iodide, copper bromide, copper chloride, copper fluoride; copper thiocyanate, copper nitrate, copper acetate, copper naphthenate, copper caprate, copper laurate, copper stearate, copper acetylacetonate, and copper oxide. Preferred copper heat stabilizers include copper halides selected from copper iodide, copper bromide, copper chloride, and copper fluoride. A preferred copper species is copper iodide, and preferably copper (I) iodide.

The copper heat stabilizer may also include an additional metal halide selected from the group consisting of LiI, NaI, KI, $MgI_2$, KBr, and $CaI_2$ with KI or KBr.

In one aspect, the copper heat stabilizer may be a mixture of 5 to 50 weight percent copper salt, 50 to 95 weight percent of a metal halide, and from zero to 15 weight percent of a fatty acid salt. In another aspect, the copper heat stabilizer may be a mixture of 10 to 30 weight percent copper salt, 70 to 90 weight percent metal halide, and from zero to 15 weight percent fatty acid salt, or a mixture of 10 to 20 weight percent copper salt, 75 to 90 weight percent metal halide, and from zero to 12 weight percent fatty acid salt. A heat stabilizer may be a mixture of copper iodide and potassium iodide (CuI/KI). An example of a copper heat stabilizer is Polyadd P201 from Ciba Specialty Chemicals comprising a blend of 7:1:1 weight ratio of potassium iodide, cuprous iodide, and aluminium stearate respectively.

The blends and composites of the present invention may be prepared by the melt blending of the polymers and the various additives and fillers used together via a conventional method. For example, the blends and composites of the present invention may be prepared via reactive extrusion of the polymers, additives and fillers in an extruder, such as a twin screw extruder, at a processing temperature of between about 240-250° C., screw speed of about 100-200 rpm and a cycle time of about 1 to 2 minutes. Following extrusion blending, injection molding may be as a method of producing testing samples, prototypes and components from the blended material. The injection temperature may vary between about 240-250° C. and the mold temperature may vary between about 30-90° C.

IV. Applications

The composites described herein can be used to prepare an article of manufacture that is made from blends and the composites of the present invention. Examples include but are not limited to, injection molded articles, such as auto parts, including under-the-hood car parts, toys, consumer products, building materials, etc.

In order to aid in the understanding and preparation of the present invention, the following illustrative, non-limiting examples are provided.

EXAMPLES

Compositions

The compositions of blends that are described in this patent are listed below. Individual blends can be identified by their ID number.

TABLE 1

Nylon composites with hybridized fillers.

| | | Nylon | | | Biocarbon | | | | Fiber | Mineral filler | | Additives |
|---|---|---|---|---|---|---|---|---|---|---|---|---|
| ID | Nylon 6 B3K | Nylon 6 B27E | Nylon 6,10 | Ground | Milled | Milled and sieved | Low temp. | High temp. | Glass fiber | Talc | Nano clay | ENR-25 |
| 1 | 100 | — | — | — | — | — | — | — | — | — | — | — |
| 2 | 80 | — | — | — | — | 20 | — | — | — | — | — | — |
| 3 | 75 | — | — | — | — | 25 | — | — | — | — | — | — |

TABLE 1-continued

Nylon composites with hybridized fillers.

| | Nylon | | | Biocarbon | | | | | Fiber | Mineral filler | | |
|---|---|---|---|---|---|---|---|---|---|---|---|---|
| ID | Nylon 6 B3K | Nylon 6 B27E | Nylon 6,10 | Ground | Milled | Milled and sieved | Low temp. | High temp. | Glass fiber | Talc | Nano clay | Additives ENR-25 |
| 4 | 70 | — | — | — | — | 30 | — | — | — | — | — | — |
| 5 | 80 | — | — | — | — | 20 | — | — | — | — | — | 3 phr |
| 6 | 75 | — | — | — | — | 20 | — | — | — | 5 | — | 3 phr |
| 7 | 75 | — | — | — | — | 20 | — | — | 5 | — | — | 3 phr |
| 8 | 70 | — | — | — | — | 20 | — | — | 5 | 5 | — | 3 phr |
| 9 | 65 | — | — | — | — | 25 | — | — | 7 | — | 3 | 3 phr |
| 10 | 75 | — | — | — | — | 20 | — | — | 5 | — | — | — |
| 11 | 70 | — | — | — | — | 20 | — | — | 10 | — | — | — |
| 12 | 70 | — | — | — | — | 20 | — | — | 10 | — | — | 3 phr |
| 13 | 65 | 5 | — | — | — | 20 | — | — | 10 | — | — | 3 phr |
| 14 | — | — | 100 | — | — | — | — | — | — | — | — | — |
| 15 | — | — | 80 | 20 | — | — | — | — | — | — | — | — |
| 16 | — | — | 80 | — | 20 | — | — | — | — | — | — | — |
| 17 | — | — | 80 | — | — | 20 | — | — | — | — | — | — |
| 18 | — | — | 80 | — | — | — | 20 | — | — | — | — | — |
| 19 | — | — | 80 | — | — | — | — | 20 | — | — | — | — |
| 20 | 60 | — | — | — | — | 40 | — | — | — | — | — | — |

Nylon 6 B3K and B27E are from BASF Corporation. Biocarbon is miscanthus feedstock biocarbon from Competitive Green Technologies. Talc is Arctic Mist from Imerys. ENR-25 is Epoxyprene epoxidized natural rubber from Sanyo Corporation of America. Glass fiber is Chop-Vantage HP 3610 from PP Industries. Nanoclay is Nanomer I.30T from Nanocor.

TABLE 2

Ternary blend composites with hybridized fillers materials.

| | Polymer | | | Fillers | | | Additives | | | | |
|---|---|---|---|---|---|---|---|---|---|---|---|
| ID | Nylon 6 | PP | PLA | Biocarbon | Glass fiber | Carbon fiber | MAPP | MAPE | Chain extender | ENR-25 | Zinc stearate |
| 21 | 100 | — | — | — | — | — | — | — | — | — | — |
| 22 | 75 | 10 | 10 | — | — | — | 5 | — | — | — | — |
| 23 | 54.75 | 7.3 | 7.3 | 27 | — | — | — | 3.65 | 3.65 | — | — |
| 24 | 51.55 | 6.9 | 6.9 | 27 | — | 4 | 3.45 | — | — | 2 phr | 0.2 phr |
| 25 | 54.4 | 3.4 | 6.8 | 27 | 5 | — | 1.4 | 2 | — | — | 0.2 phr |
| 26 | 75 | 12.5 | 10 | — | — | — | 2.5 | — | 0 | — | — |
| 27 | 75 | 7.5 | 10 | — | — | — | 7.5 | — | 0 | — | — |
| 28 | 75 | 10 | 10 | — | — | — | 2.5 | — | 2.5 | — | — |
| 29 | 75 | 7.5 | 10 | — | — | — | 0 | — | 7.5 | — | — |
| 30 | 75 | 10 | 10 | — | — | — | 0 | — | 5 | — | — |
| 31 | 75 | 12.5 | 10 | — | — | — | 0 | — | 2.5 | — | — |
| 32 | 75 | 10 | 10 | — | — | — | 1.25 | — | 3.75 | — | — |
| 33 | 75 | 10 | 10 | — | — | — | 3.75 | — | 1.25 | — | — |

Nylon 6 is Ultramid B27E from BASF Corporation. PP is PP 1120H from Pinnacle Polymers. PLA is Ingeo 3251D from Natureworks LLC. Biocarbon is miscanthus feedstock biocarbon from Competitive Green Technologies. MAPP is Fusabond P353 from DuPont. MAPE Fusabond N493 from DuPont. ENR-25 is Epoxyprene epoxidized natural rubber from Sanyo Corporation of America. Glass fiber is Chop-Vantage HP 3610 from PP Industries. Chain extender is ZeMac Extend L65 from Vertellus Specialties. Zinc stearate is from Fisher Scientific.

TABLE 3

Composites of bio-based nylon 6,10 with processed biocarbon.

| | Nylon | Biocarbon | | | | |
| | | Un-sieved | | Milled and sieved | | |
| | | Ground | Milled | | | |
| ID | Nylon 6,10 | <1 mm | <500 μm | 426-500 μm | 213-250 μm | <63 μm |
|---|---|---|---|---|---|---|
| 34 | 100 | — | — | — | — | — |
| 35 | 80 | 20 | — | — | — | — |
| 36 | 80 | — | 20 | — | — | — |
| 37 | 80 | — | — | 20 | — | — |
| 38 | 80 | — | — | — | 20 | — |
| 39 | 80 | — | — | — | — | 20 |

Nylon 6,10 is bio-based Mazmid 6.10 from Mazzaferro Industria e Comercio de Polimeros e Fibres Ltda (Brazil). Biocarbon is miscanthus feedstock biocarbon from Competitive Green Technologies.

TABLE 4

Melt enhanced and processed stabilized hybrid composites

| | Polymer | | | Fillers | | Additives | | Conditioning |
| | | | | | | | Thermal | Thermal |
| ID | Nylon 6 | PP | PLA | Biocarbon | Carbon fiber | MAPP | stabilizer | aging hours |
|---|---|---|---|---|---|---|---|---|
| 40 | 57.8 | 6.8 | 0 | 27 | 5 | 3.4 | 0 | 0 |
| 41 | 56.44 | 6.8 | 1.36 | 27 | 5 | 3.4 | 0 | 0 |
| 42 | 55.08 | 6.8 | 2.72 | 27 | 5 | 3.4 | 0 | 0 |
| 43 | 53.72 | 6.8 | 4.08 | 27 | 5 | 3.4 | 0 | 0 |
| 44 | 57.8 | 6.8 | 0 | 27 | 5 | 3.4 | 0 | 1000 |
| 45 | 57.8 | 6.8 | 0 | 27 | 5 | 3.4 | 0.5 phr | 0 |
| 46 | 57.8 | 6.8 | 0 | 27 | 5 | 3.4 | 0.5 phr | 1000 |
| 47 | 51 | 6.8 | 6.8 | 27 | 5 | 3.4 | 0 | 0 |
| 48 | 51 | 6.8 | 6.8 | 27 | 5 | 3.4 | 0 | 1000 |
| 49 | 51 | 6.8 | 6.8 | 27 | 5 | 3.4 | 0.5 phr | 0 |
| 50 | 51 | 6.8 | 6.8 | 27 | 5 | 3.4 | 0.5 phr | 1000 |
| 51 | 70 | 0 | 0 | 30 | 0 | 0 | 0 | 0 |
| 52 | 70 | 0 | 0 | 30 | 0 | 0 | 0 | 1000 |
| 53 | 70 | 0 | 0 | 30 | 0 | 0 | 0.5 phr | 0 |
| 54 | 70 | 0 | 0 | 30 | 0 | 0 | 0.5 phr | 1000 |

Nylon 6 is Ultramid B27E from BASF Corporation. PP is PP 1120H from Pinnacle Polymers. PLA is Ingeo 3251D from Natureworks LLC. Biocarbon is ball milled miscanthus feedstock biocarbon from Competitive Green Technologies. MAPP is Fusabond P353 from DuPont. Thermal stabilizer is a copper iodide salt based additive containing copper (I) iodide, as well as potassium bromide and potassium iodide. Carbon fiber is post-industrial carbon fiber provided by Competitive Green Technologies. Thermal aging is conducted for 1000 hours at 140±1° C. with 7-10 air changes per hour.

TABLE 5

Polymer blends with multi-phase compatibilizers

| | Polymer | | | Compatibilizers | | | | |
| ID | Nylon 6 | PP | PLA | MA-g-PP | MA-g-PLA | MA-g-PA11-PP | MA-g-PA11-PP-PLA | MA-g-PP-PLA |
|---|---|---|---|---|---|---|---|---|
| 55 | 85 | 15 | 0 | 0 | 0 | 0 | 0 | 0 |
| 56 | 85 | 10 | 0 | 5 | 0 | 0 | 0 | 0 |
| 57 | 85 | 10 | 0 | 0 | 0 | 5 | 0 | 0 |

Example 1

A. Materials, Trade Names and Manufacturers.

In Table 6, the materials used to produce example samples are listed, as well as trade names and manufacturers.

TABLE 6

Materials used for examples, brands and suppliers.

| Chemical name | Trade Name | Manufacturer |
|---|---|---|
| Nylon 6 (PA6) | Ultramid B3K, Ultramid B27E | BASF |
| Nylon 6,10 (PA6,10) | Mazmid 6.10 | Mazzaferro Industria e Comercio de Polimeros e Fibres Ltda (Brazil) |
| Polypropylene (PP) | PP 1120H | Pinnacle Polymers |
| Polylactic acid (PLA) | PLA 3251D Ingeo | Natureworks LLC |
| Maleated polypropylene (MAPP) | Fusabond P353 | DuPont |
| Maleated polyethylene (MAPE) | Fusabond N493 | DuPont |
| Chain extender/impact modifier | ZeMac Extend L65 | Vertellus |
| Epoxidized natural rubber | Epoxyprene | Sanyo Corporation of America |
| Zinc stearate | Zinc stearate | Fisher Scientific |
| Biocarbon from miscanthus | — | Genesis Industries, Competitive Green Technologies |
| Glass fiber | Chopvantage HP 3610 | PPG Industries |
| Recycled carbon fiber | | Competitive Green Technologies |
| Surface modified nanoclay | Nanomer I.30T | Nanocor |
| Talc | Arctic Mist | Imerys Talc |
| Peroxide | Luperox 101 | Arkema |
| Maleic anhydride | Maleic anhydride | Fisher Scientific |
| Nylon 11 (PA11) | Nylon 11 | Sigma Aldrich |

B. Methods

Processing Conditions:

Nylon, poly (lactic acid) and talc were dried at 80° C. for at least 12 hours prior to processing in order to remove moisture content which is undesirable for processing while biocarbon was dried at 105° C. until constant weight. Extrusion processing was completed using three different extruders:

- Haake MiniLab II Micro Compounder and Haake MiniJet injection molding unit
- DSM Xplore Micro 15 cc twin screw extruder with DSM Micro 12 cc injection molding unit
- Leistritz co-rotating twin-screw extruder with Arburg Injection Molder Some hybridized composites were processed with multiple feeding zones in the Leistritz twin-screw extruder to manipulate mechanical properties through process design. Fiber reinforcements (glass and carbon fiber) were added in a late feeding zone in the extruder to reduce residence time, which reduces the shearing and breakdown of the individual fibers. Maintaining the integrity of the fibers increases their reinforcing effect on the composite.

Processing temperature: 240-250° C.
Injection temperature: 240-250° C.
Mold temperature: 30-80° C.
Screw speed: 100-200 RPM
Residence time: 2 minutes Maleic anhydride grafting experiments were completed using the DSM Xplore Micro 15 cc twin screw extruder for small scale experiments, and Leistritz co-rotating twin-screw extruder for larger experiments. Processing temperatures between 170 and 200° C. were used, with screw speeds between 40 to 100 RPM. All components were dried prior to grafting, and allowed to equilibrate at room temperature under vacuum.

Testing and Characterization:

Tensile and flexural properties were measured using an Instron model 3382 universal tester. Notched Izod impact strengths were determined according to ASTM D256 using a TMI 43-02 impact tester with a 5 ft-lb pendulum. Impact samples were notched using a TMI notching cutter. For each property, at least 5 specimens were tested and reported as an average value.

Melt flow index (MFI) was determined using a Qualitest 2000A melt flow indexer at 235° C. with 2160 g of weight, according to ASTM D1238. MFI samples were dried at 80° C. for at least 6 hours prior to MFI testing.

Heat deflection/distortion temperature (HDT) was measured following ASTM D648 using a TA Q800 dynamic mechanical analyzer (DMA) with a three-point bending clamp in DMA controlled force mode. The samples were equilibrated at 30° C., then ramped at 2° C./min until 250 μm of deflection was reached at a calculated preload force.

Density was measured using an Alfa Mirage MD-300S densimeter.

C. Results

TABLE 7

Comparison of polymer blends to neat nylon

| Material | Tensile strength (MPa) | Young's modulus (GPa) | Flexural strength (MPa) | Flexural modulus (GPa) | Impact strength (J/m) | Density (g/cm³) |
|---|---|---|---|---|---|---|
| Pure PA6 (100) | 78.30 (1.84) | 2.85 (0.03) | 99.7 (2.07) | 2.48 (0.07) | 53.1 (3.50) | 1.130 (0.002) |
| PA6/PP/PLA (75/15/10) theoretical * | 72.6 | 2.83 | 93.8 | 2.54 | 46 | 1.107 |
| PA6/PP/PLA (75/15/10) experimental | 62.2 (1.13) | 2.64 (0.01) | 94.4 (0.71) | 2.66 (0.03) | 52 (1.04) | 1.104 (0.001) |
| PA6/PP/PLA/MAPP (75/10/10/5) | 74.80 (0.48) | 2.83 (0.03) | 101.4 (0.42) | 2.65 (0.02) | 71.4 (3.15) | 1.085 (0.001) |

* Assumes perfect compatibility based on rule of mixtures.
Standard deviation show in brackets.

As shown in Table 7, the compatibilized ternary blend that has been designed in this invention is superior to the theoretical values expected based on the rule of mixtures. There is a synergistic effect resulting in superior tensile strength, flexural strength and impact strength than can be expected based on the blend.

The compatibilized blend also demonstrates far superior properties in comparison to the uncompatibilized experimental blend, which shows that the compatibility was significantly improved despite the inherent immiscibility of the three polymer phases. The compatibilized blend is equal to or superior to pure nylon 6 in terms of Young's modulus, flexural strength, flexural modulus, impact strength and density, while having a tensile strength that is less than 5% lower than that of pure nylon 6. An additional advantage of this ternary blend is that blending nylon with commodity polymers reduces the overall cost of the material relative to pure nylon.

Figure 1:
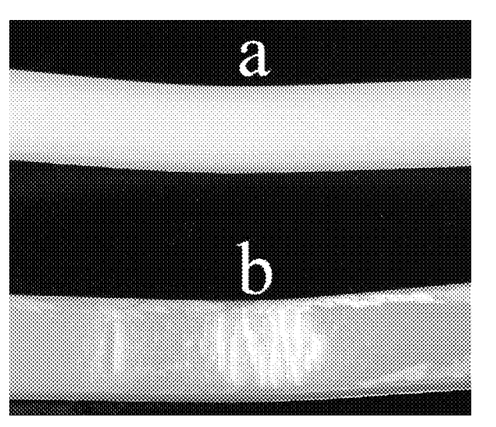
FIG. 1 illustrates a ternary polymer blend with MAPP compatibilizer (a), and with no compatibilizer (b).

FIG. 1 illustrates a clear, visible difference in the morphology of the ternary blend (FIG. 1(*a*)) after the addition of MAPP (FIG. 1(*b*)), which led to improved properties.

TABLE 8

Nylon-biocarbon hybridized biocomposites with enhanced tensile strength and modulus, flexural strength and modulus, and impact strength.

| ID | Tensile Strength (MPa) | Tensile Modulus (GPa) | Flexural Strength (MPa) | Flex. Modulus (GPa) | Elongation @ yield (%) | Elongation @ break (%) | Impact Strength (J/m) | MFI (g/10 min) | Density (g/cm$^3$) |
|---|---|---|---|---|---|---|---|---|---|
| 1 | 81.5 (2.4) | 2.61 (0.08) | 105.75 (1.08) | 2.57 (0.04) | 4.09 (0.07) | 94.5 (33.7) | 47.47 (2.52) | 30 (0.26) | 1.1289 |
| 2 | 91.3 (1.07) | 3.30 (0.06) | 136.9 (2.25) | 3.93 (0.07) | 3.79 (0.06) | 15.56 (5.2) | 49.46 (1.49) | 10 (0.15) | 1.178 (0.004) |
| 3 | 94.7 (2.47) | 3.63 (0.03) | 136.71 (2.75) | 4.18 (0.11) | 3.82 (0.09) | 11.43 (5.75) | 54.94 (1.54) | 5.868 (0.068) | 1.193 (0.0036) |
| 4 | 95.7 (2.47) | 3.93 (0.07) | 140.6 (1.06) | 4.34 (0.02) | 3.45 (0.08) | 12.39 (3.38) | 52.42 (3.42) | 5.676 (0.099) | 1.207 (0.004) |
| 5 | 79.9 (2.11) | 3.13 (0.07) | 116.02 (2.36) | 3.39 (0.07) | 3.65 (0.07) | 18.79 (6.00) | 80.23 (7.43) | 8.06 (0.130252) | 1.169 (0.002) |
| 6 | 83.3 (1.55) | 3.38 (0.06) | 119.26 (0.71) | 3.84 (0.08) | 3.63 (0.11) | 16.45 (2.7) | 76.58 (6.46) | 4.336 (0.128911) | 1.208 (0.002517) |
| 7 | 98.8 (1.32) | 3.92 (0.04) | 132.19 (2.34) | 3.98 (0.09) | — | 5.79 (0.46) | 59.9 (4.59) | 6.726 (0.142917) | 1.2 (0.009) |
| 8 | 101 (1.43) | 4.34 (0.114) | 142.2 (2.05) | 4.87 (0.09) | — | 4.31 (0.29) | 59.82 (2.44) | 3.354 (0.126008) | 1.245 (0.002) |
| 9 | 95.5 (5.87) | 4.16 (0.51) | 145.75 (1.12) | 4.77 (0.02) | — | 4.66 (0.27) | 40.06 (2.65) | 3.552 (0.137) | 1.25 (0.003) |
| 10 | 113 (1.77) | 4.33 (0.124) | 149.04 (2.3) | 4.48 (0.05) | — | 6.15 (1.08) | 35.69 (3.09) | 8.16 (0.1265) | 1.217 (0.0026) |
| 11 | 128 (4.51) | 4.87 (0.25) | 164.59 (4.35) | 5.09 (0.158) | — | 4.92 (0.28) | 44.41 (6.35) | 5.604 (0.114) | 1.254 (0.0021) |
| 12 | 113 (0.29) | 4.68 (0.88) | 144.6 (1.84) | 4.42 (0.08) | — | 4.09 (0.44) | 61.00 (5.36) | 4.668 (0.1996) | 1.245 (0.001) |
| 13 | 113 (3.20) | 4.62 (0.01) | 144.81 (3.397) | 4.39 (0.124) | — | 3.96 (0.33) | 61.696 (5.811) | 4.572 (0.119) | 1.243 (0.005) |

TABLE 9

Change in properties with biocarbon pre-processing and fractionation

| ID | Tensile Strength (MPa) | Tensile Modulus (GPa) | Flexural Strength (MPa) | Flexural Modulus (GPa) | Elongation @ yield (%) | Elongation @ break (%) | Impact Strength (J/m) | Density (g/cm$^3$) |
|---|---|---|---|---|---|---|---|---|
| 14 | 66.7 (2.37) | 1.81 (0.05) | 66.66 (1.59) | 1.53 (0.04) | — | — | 69.72 (8.02) | 1.037 (0.015) |
| 15 | 42.1 (7.14) | 1.81 (0.05) | 79.3 (1.91) | 1.9 (0.05) | — | — | 21.12 (5.02) | 1.099 (0.004) |
| 16 | 73.7 (1.08) | 2.59 (0.05) | 105.7 (1) | 2.7 (0.03) | — | — | 30.19 (1.62) | 1.105 (0.008) |
| 17 | 67.9 (2.35) | 2.24 (0.1) | 87.4 (2.72) | 2.18 (0.08) | — | — | 59.36 (6.53) | 1.112 (0.002) |
| 18 | 97.4 (1.76) | 3.14 (0.04) | 138.94 (2.15) | 3.59 (0.03) | — | 7.75 (2.24) | 32.16 (2.44) | 1.165 (0.007) |
| 19 | 81.1 (5.05) | 3.27 (0.05) | 127 (1.18) | 3.56 (0.04) | 3.49 (0.27) | 18.3 (4.31) | 48.38 (4.31) | — |
| 20 | 96.6 (1.23) | 3.34 (0.02) | 155.82 (1.74) | 4.6 (0.06) | — | 7.69 (1.8) | 30.9 (2.5) | 1.220 (0.0017) |

TABLE 10

Ternary blend composites with biocarbon/carbon fiber/glass fiber hybridized filler materials maintaining high MFI and HDT

| | Properties | | | | | | | |
|---|---|---|---|---|---|---|---|---|
| ID | Tensile strength (MPa) | Young's modulus (GPa) | % elongation at yield | Density (g/cm3) | Flexural strength (MPa) | Flexural modulus (GPa) | Impact strength (J/m) | HDT (° C.) | MFI (g/10 min) |
| 21 | 78.3 (1.84) | 2.85 (0.03) | 3.67 (0.07) | 1.13 (0.002) | 99.69 (2.07) | 2.48 (0.0704) | 53.104 (3.501) | 142 | 32.51 (0.99) |
| 22 | 74.8 (0.48) | 2.83 (0.03) | 3.76 (0.01) | 1.085 (0.001) | 101.37 (0.42) | 2.651 (0.01637) | 71.393 (3.152) | 110 | 10.27 (0.103) |
| 23 | 65.5 (1.34) | 3.52 (0.08) | 2.87 (0.07) | 1.171 (0.003) | 107.29 (1.96) | 3.52 (0.461) | 31.429 (1.345) | 164 | 12.024 (2.38) |
| 24 | 75.3 (1.51) | 4.48 (0.06) | 2.59 (0.04) | 1.172 (0.001) | 110.2 (0.42) | 4.43 (0.04) | 24.565 (4.099) | 192 | 15.88 (1.3) |
| 25 | 76.1 (1.12) | 3.83 (0.07) | 3.02 (0.09) | 1.2 (0.02) | 127.01 (1.15) | 4.06 (0.018) | 24.332 (5.678) | — | 19.73 (1.89) |

TABLE 11

Optimization of blending two compatibilizing agents to maximize impact strength of polymer matrix material.

| ID | Impact strength (J/m) | Standard deviation |
|---|---|---|
| 22 | 71.39 | 3.15 |
| 26 | 55.13 | 2.98 |
| 27 | 62.82 | 2.62 |
| 28 | 84.65 | 6.38 |
| 29 | 77.26 | 11.38 |
| 30 | 86.29 | 3.76 |
| 31 | 90.52 | 7.81 |
| 32 | 73.21 | 4.12 |
| 33 | 67.96 | 9.72 |

Blended alloys of nylon, PLA and PP were designed to improve several key properties of the matrix material. Additives including maleated co-polymer and chain extenders were utilized to improve the properties of the polymer blend. To the best of our knowledge, this ternary blend has not been tried before in nylon based composite systems.

A blend of nylon/PLA/PP was designed with improved impact strength (+34%) and flexural modulus (+7%), reduced density (−3.5%) and otherwise similar properties compared to virgin nylon.

A base composite of nylon and biocarbon at different concentrations were used in conjunction with other polymers and fillers.

Nylon can be sourced from post-consumer recycled nylon to reduce environmental impact through repurposing waste materials.

High grade composites intended for under-the-hood applications were prepared containing up to 30-35% biobased content, which has not been accomplished before to our knowledge. To our knowledge no biocomposites have been successfully prepared for high-temperature high-strength (i.e. under-the-hood) applications with such reduced weight and odorless biocomposites.

Biocarbon from different sources were used as filler to derive composites with specialized properties.

Biocarbon was processed through grinding and milling operations to optimize particle size and range for optimum mechanical properties. Mechanical properties of the composite, such as impact strength and modulus were tailored by the pre-processing of biocarbon.

Utilization of biocarbon as a filler in engineering polymers such as nylon eliminates the issues of filler degradation at higher temperatures, potentially harmful odors during composite fabrication, matrix-filler interface inferiority due to break down of filler, colorant, increase in biobased content and reduction in use of synthetic polymers and reduction in the hydrophilicity of the composites.

Addition of biocarbon to nylon at different concentrations can result to an about 33% increase the heat deflection temperature (HDT).

About 47% improvement in flexural strength can be achieved by the addition of biocarbon to nylon depending on the concentration.

About 20% improvement in the tensile strength can be achieved by the addition of biocarbon to nylon depending on the concentration.

A maximum reduction in the impact strength of only 25% can be observed by the addition of biocarbon as high as 40% loading to nylon while improving other properties above the neat nylon.

Tensile and flexural moduli are improved by about 28 and 79% respectively, by the addition of biocarbon up to 40% weight loading.

Improvement in the impact strengths as high as 100% of the neat nylon in the presence of at least 20% weight biocarbon can be obtained by the addition of very low concentrations of epoxidized natural rubber (ENR) to the composites while maintaining tensile and flexural properties which surpasses or are equal to that of neat nylon.

ENR can react with both nylon and biocarbon to yield a synergistic ternary component system with well balance properties.

Morphological analysis reveal partial and in some cases full encapsulation of biocarbon by the ENR. Well dispersed ENR phases, at average of 3 microns in diameter within the nylon phase is also noticed. These lead to improvements in the impact strength at very low concentrations of ENR while still having well balanced tensile and flexural properties.

Mineral fillers such as talc and nanoclay, fibers such as glass and carbon were added separately or in combination to the either the binary or hydrid composite of nylon/biocarbon or nylon/ENR/biocarbon respectively.

Addition of biocarbon to nylon did not affect the water absorption negatively unlike natural fibers do.

Light weighting is achieved of composites as low as 1.17 g/cc with improved properties in comparison to those commercially available talc or glass filled nylon composites ranging from 1.3 to 1.4 g/cc.

Injection molded nylon-biocarbon composites (using biocarbon unlike surface treated biocarbon) with impact strength of 80 J/m and modulus of 3.39 GPa have been invented.

Another advantageous aspect of using biocarbon is that it reduces the cost of the final formulation, as up to 40 wt % of the polymer matrix can be replaced with these fillers as per the property requirements of the end product.

Biocarbon is preferable over other particulate fillers such as carbon black, talc or clay due to its cheapness, availability, lower density, sustainability, renewability and biobased nature.

Fractionating biocarbon in to different particle sizes and ranges and then incorporated into nylon reveal different properties. Depending on the fraction size range, improvements in impact strength was noticed whereas in others tensile and flexural strengths were improved.

Biocarbon pyrolyzed at high and low temperatures reveal difference in interface adhesion resulting in either poor or enhanced tensile and flexural strengths.

Biocarbon was added to the nylon directly without any surface treatment to achieve the required performance.

Hybridization of two or more fibers in a composite formulation is possible which can potentially enhance the performance of the composites while having balanced strength and HDT. This will especially be important in case of fiber supply chain issues that can arise while using one particular type of fiber.

Tensile strength as high as 128 MPa and tensile modulus as high as 4.9 GPa was achieved in nylon composites with hybridized biocarbon/glass fiber reinforcement.

Impact strength as high as 61 J/m was achieved in hybridized nylon biocarbon/glass fiber composites with filler content of 30% by weight.

Tensile strength as high as 75 MPa and tensile modulus as high as 4.5 GPa was achieved in low density composites (1.17 g/cm3) with nylon/PP/PLA blends with hybridized reinforcement of biocarbon and carbon fiber.

HDT as high as 192° C. was achieved with nylon/PP/PLA blends with hybridized reinforcement of biocarbon and carbon fiber.

Hybrid biocomposites with up to 32% filler materials which maintain high processability (melt flow index over 10 g/10 min) for injection molding purposes.

Example 2—Bio-Based Polyamide and Biocarbon

A. Materials and Methods

The polyamide used was a bio-based polyamide 6,10 (Table 3). Biocarbon used in this work presented in Table 3.

Sample Preparation

All materials were dried prior to usage. The biocarbon was milled using a ball mill. PA 6,10 composites were made with biocarbon at 20 wt. % loading from crushed, milled and fractionated milled biocarbon particle size ranges of <63, 213-250 and 426-500 μm. The crushed biocarbon used here was broken down to smaller particles (below 1 cm) to allow for easy access through the hopper of the compounder during processing. The milled biocarbon had a particle size range of <500 μm. All composites were processed using a HAAKE MiniLab II Micro Compounder (Thermo Scientific, MA, USA) and then injection molded using a HAAKE MiniJet Injection molding machine (Thermo Scientific, MA, USA). For simplicity and ease of identification, the composites have been referred to as BC-1, BC-2, BC-3, BC-4 and BC-5 for nylon filled with crushed, <500, 426-500, 213-250 and <63 μm respectively.

Morphological Analysis

The surface morphology of the biocarbon and the interface between the matrix and the filler of the composites were analyzed using a scanning electron microscopy (SEM, FEI Inspect S50, OR, USA).

The heat deflection temperature (HDT) of the samples was measured according to ASTM standard D648 on a Dynamic Mechanical Analyzer (DMA, TA Instruments) with a width and thickness of 12.6 mm and 3.35 mm respectively. A preload force of less than 1 N was applied to the sample and scanned from 20 to 200° C. at a rate of 2° C./min.

Particle Size Distribution

Approximately 500 g of dry milled biocarbon was sieved into various particle size ranges using a sieve shaker (H-4330) manufactured by Humbolat Mfg. Co. (USA). The initial and final weight of each sieve was measured and the difference was used to determine the particle size distribution based on weight fraction of the biocarbon obtained from each sieve.

Mechanical Properties

The samples were conditioned at 23±2° C. and 50±5% relative humidity for a period of 40 h prior to testing. Tensile properties were measured using the samples prepared according to Type V specimen of ASTM standard D638. The tests were conducted on a Universal Testing Machine (Instron Norwood, Mass., USA) at room temperature and at a crosshead speed of 100 mm/min. It should be noted that none of the composite materials conformed to the ASTM standard, but were tested at 100 mm/min for direct comparison to the neat nylon.

Flexural properties were measured using the samples prepared according to procedure B of ASTM standard D790. The tests were conducted on a Universal Testing Machine (Instron Norwood, Mass., USA) at room temperature and at a crosshead speed of 9.6 mm/min.

Impact strengths of the samples were measured in accordance with ASTM D256. The samples were notched to a depth of 2 mm just after injection molding. The tests were conducted on a TMI Monitor Impact Tester (Testing Machines Inc., DE, USA) at room temperature.

B. Results

TABLE 12

Properties of nylon biocarbon composites with varying particle size.

| ID | HDT ° C. | Tensile strength (MPa) | Flexural strength (MPa) | Impact strength (J/m) | Young's modulus (GPa) | Flexural modulus (GPa) |
|---|---|---|---|---|---|---|
| 34 | 150.26 (0.89) | 66.7 (2.37) | 66.66 (1.59) | 69.72 (8.02) | 1.81 (0.05) | 1.53 (0.04) |
| 35 | 177.61 (2.29) | 42.1 (7.14) | 79.3 (1.91) | 21.12 (5.02) | 2.11 (0.04) | 1.9 (0.05) |
| 36 | 184.04 (3.39) | 73.7 (1.08) | 105.7 (1.00) | 30.19 (1.62) | 2.59 (0.05) | 2.7 (0.03) |
| 37 | 183.24 (0.34) | 69.8 (1.81) | 98.8 (0.48) | 41.1 (4.63) | 2.5 (0.01) | 2.5 (0.01) |
| 38 | 185.46 (0.63) | 67.5 (2.51) | 88.7 (0.90) | 43.9 (4.42) | 2.19 (0.03) | 2.19 (0.03) |
| 39 | 188.82 (0.56) | 67.9 (2.35) | 87.4 (2.72) | 59.36 (6.53) | 2.18 (0.08) | 2.18 (0.08) | i. Heat Deflection Temperature (HDT)

The HDT increased from 150 to 177° C. with the incorporation of crushed biocarbon. A further increase of 24% is noticed when milled and fractionated biocarbon with smaller particles are added to PA 6,10 up to below 63 μm (composition 39).

ii. Mechanical Properties

Tensile Properties

An increase in the tensile moduli of the composites was noticed when compared to that of the neat PA 6,10. The modulus can be observed to increase by 44% with the addition of biocarbon up to composition 36 and then slightly declines successively up until composition 39. The presence of particles of smaller size in the milled sample (composition 36) increases the modulus when compared to composition 35. The addition of crushed biocarbon on the tensile strength of PA 6,10 showed an initial decrease of 36.7% (composition 35). However, an increase of 75% was observed in composition 36 with milled biocarbon when compared to composition 35. The strength of composition 36 surpassed that of PA 6,10, and then a slight and continuous decrease was noticed in composition 37, composition 38 and composition 39 successively.

Flexural Properties

It was observed that both the flexural strength and modulus increase with the addition of biocarbon to the matrix up to composition 36, with respect to the neat PA 6,10, and then decreased up until composition 38. Although the flexural properties decreased at composition 39, they are still greater than those of the neat PA 6,10 by ~30%. Similar to the tensile strength, the flexural strengths of the composites follow the same trend. It can be observed that composition 36 also shows the highest strength and then a progressive reduction thereafter as the particle size ranges are decreased.

Impact Properties

The addition of crushed biocarbon (composition 35) decreased the impact strength of PA 6,10 by 70%. However, the addition of milled and fractionated biocarbons to PA 6,10 (compositions 36 to 39), increased the impact strength in the following order: composition 36<composition 37<composition 38<composition 39, when compared to composition 35.

The impact strength of (composition 39) showed the most improvement, which is approximately equal to that of the neat PA 6,10 when the standard deviation is considered.

It is common knowledge that the addition of filler to a matrix restricts the chain mobility and therefore decreases the impact strength. No study till date has investigated the use of biocarbon in nylon especially to achieve equal or better impact strength at significantly high loadings while still maintaining similar or even better tensile and flexural properties. In our case studies, we have been able to achieve similar or better impacts strengths in comparison to the neat polymer by applying specific and deliberate pre-treatments to the filler material.

The nylon used in this Example 2 was 100% biobased nylon 6, 10. Here the biocarbon was pre-treated by ball milling and then sieved to a particle size of 63 microns and less. Here we find that incorporating biocarbon as high as 20 wt % with particles as large as 63 microns can match the impact strength of the nylon while having better flexural strength and comparable strength.

Based on this study, we show that we can incorporate a high loading of biocarbon and still achieve comparable impact strength to that of the neat nylon.

Example 3—Biocarbon and its Size Effects on Polyamide 6/Biocarbon Composites

In this study, we pretreat the biocarbon by ball milling for different time periods. These pretreated biocarbons are incorporated into the nylon matrix at 10 wt. % loading to fabricate composites. We find that at very small particle sizes; mean particle sizes between 3.803-2.039 microns, the impact strength is the same as that of neat nylon 6 while the strength is comparable.

Based on this study, nylon/biocarbon composites with a mean biocarbon particle size of 3.0803 microns and below show equal or better impact strengths to that of the nylon while also enhancing the flexural and tensile properties.

Example 4—Nylon 6/Biocarbon Composite

Similar to Example 2, we incorporate biocarbon with particle size of 63 microns and below into nylon 6 to investigate if the same effect is occurring when a different nylon is used. We find this to be true; a similar effect is observed. Equal or better impact strength, with better or comparable tensile and flexural properties is observed. See Table 13 below for mechanical properties.

TABLE 13

Nylon 6 composite with 20% biocarbon with improved mechanical properties.

| Material | Tensile strength (MPa) | Young's modulus (GPa) | Flexural strength (MPa) | Flexural modulus (GPa) | Impact strength (J/m) |
|---|---|---|---|---|---|
| Pure PA6 | 81.5 (2.4) | 2.61 (0.08) | 105.75 (1.08) | 2.57 (0.04) | 47.47 2.52) |
| PA6 + biocarbon (80/20) | 91.3 (1.07) | 3.30 (0.06) | 136.9 (2.25) | 3.93 (0.07) | 49.46 (1.49) |

Based on this study, applying the same pretreated biocarbon to different nylons have similar effects of equal or better impact strength in comparison to the neat nylon.

Example 5—Melt Flow Enhancement of PA6/PP Hybrid Composites by Addition of PLA PA6/PP blend composites reinforced with hybridized biocarbon and carbon fiber possess excellent mechanical properties with relatively low densities. However, high loadings of biocarbon and carbon fiber can restrict the melt flow of such composites. In this study, we utilized the addition of small fractions of PLA to significantly enhance the melt flow of these composites. We found that replacing even a small portion (2% by weight) of the polyamide fraction with PLA, the melt flow index (MFI) can be increased by over 16×, with further increases as the PLA fraction increased. Table 14 below shows the melt flow index of several such blends. Table 15 demonstrates that incremental addition of PLA has minimal effect on the strength and stiffness of the material.

TABLE 14

Melt flow enhancement of PA6/PP hybrid composites by PLA addition.

| ID | PLA fraction (wt. %) | Melt flow index (g/10 min) |
| --- | --- | --- |
| 40 | 0 | 0.56 ± 0.09 |
| 41 | 2 | 9.20 ± 0.83 |
| 42 | 4 | 10.40 ± 1.04 |
| 43 | 6 | 15.84 ± 1.91 |

TABLE 15

Effect of fractional PLA addition on mechanical properties of PA6/PP hybrid composites.

| | Properties | | | | |
| --- | --- | --- | --- | --- | --- |
| ID | Tensile strength (MPa) | Young's modulus (GPa) | Flexural strength (MPa) | Flexural modulus (GPa) | Yield elongation (%) |
| 40 | 80.7 (0.24) | 6.63 (0.03) | 126.32 (1.31) | 4.24 (0.06) | 3.47 (0.05) |
| 41 | 80.0 (0.72) | 6.37 (0.37) | 127.24 (2.73) | 4.65 (0.16) | 3.60 (0.21) |

Example 6—Thermally Stabilized Hybrid Biocomposites

In this study, we demonstrate that through the addition of a copper salt based heat stabilizer, the long term mechanical performance of binary (PA6/PP) and ternary (PA6/PP/PLA) hybrid biocomposites exposed to high temperatures can be significantly enhanced, resulting in a composite that is suited for applications requiring high thermal stability.

Composites were subjected to accelerated heat aging at 140° C. for 1000 hours in an oven with 7-10 air changes per hour. Homologous composites were prepared with and without the added thermal stabilizer.

As shown in Table 16, the addition of a copper salt stabilizer improved the property retention of tensile strength, flexural strength, and impact strength in both binary and ternary polymer blends reinforced with biocarbon and carbon fiber. Furthermore, nylon-biocarbon blends with excellent thermal stability were produced. In particular, both PA6-biochar and PA6/PP-biochar carbon fiber demonstrated excellent properties when thermally stabilized. In the thermally stabilized PA6-biochar (ID:54) and PA6/PP-biochar-carbon fiber (ID:46) blends, non-yielding behaviour due to brittle behaviour was reduced by the addition of the thermal stabilizer.

TABLE 16

Thermally stabilized hybrid composites. Homologous blends indicated in ID column [before aging/after aging].

| | Property retention after 1000 h (% of original property retained) | | | | | | |
| --- | --- | --- | --- | --- | --- | --- | --- |
| ID | Tensile strength | Young's modulus | Flexural strength | Flexural modulus | Yield elongation | Break elongation | Izod impact strength |
| [40/44] | 41.39 | 98.19 | 61.11 | 117.22 | — | 5.86 | 40.74 |
| [45/46] | 97.68 | 95.04 | 78.67 | 117.87 | 55.03 | 20.09 | 50.40 |
| [47/48] | 49.61 | 119.58 | 38.89 | 115.98 | — | 18.87 | 46.00 |
| [49/50] | 62.74 | 118.65 | 57.14 | 122.41 | — | 31.97 | 50.89 |
| [51/52] | 42.07 | 119.10 | 39.71 | 126.25 | — | 5.81 | 44.89 |
| [53/54] | 107.9 | 115.10 | 118.98 | 121.56 | 102.91 | 35.70 | 65.27 |

Example 7—Multi-Phase Compatibilizers for PA6/PP Blends

In this study, new compatibilization routes were designed for PA6 blend systems. PA6/PP binary systems are conventionally compatibilized via a maleated polyolefin such as maleic anhydride grafted polypropylene (MA-PP). A new binary compatibilizing agent was designed by the reactive grafting of MA onto PP and PA11 simultaneously, referred to as PA11-co-PP-MA. This new binary compatibilizing agent, when added to a binary system of PA6 and PP (ID: 57), demonstrates a superior tensile strength, Young's modulus, flexural strength, and break elongation compared to the uncompatibilized system (ID: 55) and the commercial MA-PP compatibilized system (ID: 56).

TABLE 17

Polymer systems compatibilized with varying compatibilizing agents, including multi-phase compatibilizers.

| | Properties | | | | | | |
|---|---|---|---|---|---|---|---|
| ID | Tensile strength (MPa) | Young's modulus (GPa) | Flexural strength (MPa) | Flexural modulus (GPa) | Yield elongation (%) | Break elongation (%) | Izod impact strength (J/m) |
| 55 | 63.4 (1.1) | 2.870 (0.16) | 96.0 (1.1) | 2.67 (0.03) | 3.93 (0.08) | 16.87 (6.05) | 73.5 (5.2) |
| 56 | 65.4 (0.3) | 2.799 (0.08) | 98.3 (1.9) | 2.60 (0.07) | 4.13 (0.04) | 50.24 (18.91) | 107.0 (12.9) |
| 57 | 67.6 (0.4) | 3.671 (0.12) | 102.2 (0.5) | 2.69 (0.01) | 3.81 (0.06) | 67.47 (18.63) | 60.2 (5.7) |

CONCLUSION

Based on the data presented herein (Examples 2-4), we have been able to engineer specifically, a filler from biocarbon which not only reinforces nylon but also matches or improves the composite impact strength at high loadings which is contrary to the well-known and accepted idea that fillers typically reduce the impact strengths of polymers especially at higher loadings. Composites have been designed with high melt flow rates via fractional PLA addition. Furthermore, we have engineered biocarbon-reinforced nylon systems with excellent thermal stability suitable for automotive applications.

A number of embodiments of the invention have been described. Nevertheless, it will be understood that various modifications may be made without departing from the spirit and scope of the invention. Accordingly, other embodiments are within the scope of the following claims.

REFERENCES

Agrawal, P., Oliveira, S. I., Araújo, E. M., & Melo, T. J. (2007). Effect of different polypropylenes and compatibilizers on the rheological, mechanical and morphological properties of nylon 6/PP blends. *Journal of Materials Science*, 42(13), 5007-5012.

Bose, S., & Mahanwar, P. (2004). Effect of flyash on the mechanical, thermal, dielectric, rheological and morphological properties of filled nylon 6. *Journal of Minerals & Materials Characterization & Engineering*, 3, 65-89.

Bose, S., & Mahanwar, P. (2004). Effect of particle size of filler on properties of nylon-6. *Journal of Minerals & Materials Characterization & Engineering*, 3, 23-31.

Cantwell, W., & Morton, J. (1991). The impact resistance of composite materials—a review. *Composites*, 22(5), 347-362.

Das, O., Sarmah, A. K., & Bhattacharyya, D. (2015). A novel approach in organic waste utilization through biocarbon addition in wood/polypropylene composites. *Waste Management*, 38, 132-140.

Fornes, T., & Paul, D. (2003). Modeling properties of nylon 6/clay nanocomposites using composite theories. *Polymer*, 44, 4993-5013.

Fu, S.-Y., Feng, X.-Q., Lauke, B., & Mai, Y.-W. (2008). Effects of particle size, particle/matrix interface adhesion and particle loading on mechanical properties of particulate—polymer composites. *Composites Part B: Engineering*, 39(6), 933-961.

Hamad, K., Kaseem, M., & Deri, F. (2011). Rheological and mechanical characterization of poly (lactic acid)/polypropylene polymer blends. *Journal of Polymer Research*, 18(6), 1799-1806.

Huber, T., Misra, M., & Mohanty, A. (2015). The Effect of Particle Size on the Rheological Properties of Polyamide 6/Biocarbon Composites. *Proceeding of 30th International Conference of the Polymer Processing Society (pp. 15004 (1-4))*. Cleveland, Ohio, USA: AIP Conference Proceedings.

Huber, T., Misra, M., & Mohanty, A. K. (2014). Mechanical properties of compatibilized nylon 6/polypropylene blends; studies of the interfacial behavior through an emulsion model. *Journal of Applied Polymer Science*, 131(18), 40792.

La Mantia, F. P. (1993). *Blends of polypropylene and nylon 6: Influence of the compatibilizer, molecular weight, and processing conditions. Advances in Polymer Technology*, 12(1), 47-59.

Liang, J.-Z. (2002). Toughening and reinforcing in rigid inorganic particulate filled poly(propylene): A review. *Journal of Applied Polymer Science*, 83(7), 1547-1555.

Mohanty, A., Tummala, P., Misra, M., & Drzal, L. (2009). U.S. Pat. No. 7,582,241, 2009.

Mohanty, A., Vivekanandhan, S., Anstey, A., & Misra, M. (2015). Sustainable Composites from Renewable Biocarbon and Engineering Plastic. *20th International Conference on Composite Materials*. Copenhagen.

Myllytie, P., Misra, M., & Mohanty, A. (2016). Carbonized Lignin as Sustainable Filler in Biobased Poly(trimethylene terephthalate) Polymer for Injection Molding Applications. *ACS Sustainable Chemistry & Engineering*, 4, 102-110.

Ozen, E., Kiziltas, A., Kiziltas, E. E., & Gardner, D. J. (2013). Natural fiber blend-nylon 6 composites. *Polymer Composites*, 34(4), 544-553.

Pai, F.-C., Lai, S.-M., & Chu, H.-H. (2013). Characterization and Properties of Reactive Poly(lactic acid)/Polyamide 610 Biomass Blends. *Journal of Applied Polymer Science*, 130(4), 2563-2571.

Ruschau, G., & Newnham, R. (1992). Critical Volume Fractions in Conductive Composites. *Journal of Composite Materials*, 26, 2727-2735.

Sathe, S. N., Devi, S., Rao, G. S., & Rao, K. (1996). Relationship between morphology and mechanical properties of binary and compatibilized ternary blends of polypropylene and nylon 6. *Journal of Applied Polymer Science*, 61(1), 97-107.

Shashidhara, G. M., Biswas, D., Pai, B. S., Kadiyala, A. K., Feroze, G. S., & Ganesh, M. (2009, July). Effect of PP-g-MAH compatibilizer content in polypropylene/nylon-6 blends. *Polymer Bulletin,* 63(1), 147-157.

Tajvidi, M., Feizmand, M., Falk, R., & Felton, C. (2008). Effect of Cellulose Fiber Reinforcement on the Temperature Dependent Mechanical Performance of Nylon 6. *Journal of Reinforced Plastics and Composites,* 28, 2781-2790.

Tandon, G., & Weng, G. (1984). The effect of aspect ratio of inclusions on the elastic properties of unidirectionally aligned composites. *Polymer Composites,* 5(4), 327-333.

Vold, J., Ulven, C., & Chisholm, B. (2014). Torrefied biomass filled polyamide biocomposites: mechanical and physical property analysis. *Journal of Materials Science,* 50, 725-732.

Wang, Y.-L., Hu, X., Li, H., Ji, X., & Li, Z.-M. (2010, September). Polyamide-6/Poly(lactic acid) Blends Compatibilized by the Maleic Anhydride Grafted Polyethylene-Octene Elastomer. *Polymer-Plastics Technology and Engineering,* 49(12), 1241-1246.

Xu, X. (2008). Cellulose Fiber Reinforced Nylon 6 or Nylon 66 Composites (Doctoral dissertation). Georgia Institute of Technology.

Yoo, T. W., Yoon, H. G., Choi, S. J., Kim, M. S., Kim, Y. H., & Kim, W. N. (2010). Effects of Compatibilizers on the Mechanical Properties and Interfacial Tension of Polypropylene and Poly(lactic acid) Blends. *Macromolecular Research,* 18(6).

What is claimed is:

1. A composite comprising a polymeric blend of polyamide (PA) and polypropylene (PP) and biocarbon and a melt flow enhancer, wherein the melt flow enhancer is poly (lactic acid) (PLA), and the PLA is 10% wt. or less of the composite.

2. The composite of claim 1, wherein the composite further comprises epoxidized natural rubber (ENR).

3. The composite of claim 1, wherein the composite further comprises a filler selected from carbon fiber, glass fiber, a mineral filler, or any combinations thereof.

4. The composite of claim 1, wherein the PA is selected from the group consisting of: PA 6, PA 6,6 PA 6,10 and biobased PA.

5. The composite of claim 1, wherein the composite further comprises maleated polyolefin.

6. The composite of claim 1, wherein the polymeric blend comprises PA 6, PLA, PP and MAPP, and wherein the composite further comprises carbon fiber, epoxidized natural rubber and zinc stearate.

7. The composite of claim 1, wherein the polymeric blend comprises PA 6, PLA, PP, MAPP and MAPE, and wherein the composite further comprises glass fiber and zinc stearate.

8. The composite of claim 1, wherein the composite further includes a copper salt thermal stabilizer.

9. An article of manufacture including the composite of claim 1.

10. An article of manufacture including the composite of claim 2.

11. An article of manufacture including the composite of claim 3.

12. An article of manufacture including the composite of claim 4.

13. An article of manufacture including the composite of claim 5.

14. A composite comprising a polymeric blend, biocarbon, carbon fiber, epoxidized natural rubber and zinc stearate, wherein the polymeric blend comprises of polyamide 6 (PA 6), polypropylene (PP) and maleated polypropylene (MAPP).

15. An article of manufacture comprising the composite of claim 14.

16. A composite comprising a polymeric blend, biocarbon, glass fiber and zinc stearate, wherein the polymeric blend comprises polyamide 6 (PA 6), poly (lactic acid) (PLA), polypropylene (PP), maleated polypropylene (MAPP), and maleated polyethylene (MAPE).

17. The composite of claim 16, wherein the composite further comprises epoxidized natural rubber (ENR).

18. An article of manufacture including the composite of claim 16.

19. An article of manufacture including the composite of claim 17.

* * * * *